United States Patent
Green, Jr.

[15] 3,635,789
[45] Jan. 18, 1972

[54] DEINKING OF WASTE XEROGRAPHIC COPY PAPER

[72] Inventor: Charles J. Green, Jr., Webster, N.Y.
[73] Assignee: Xerox Corporation, Rochester, N.Y.
[22] Filed: May 2, 1969
[21] Appl. No.: 821,375

[52] U.S. Cl. .......................................... 162/5, 209/162
[51] Int. Cl. .......................................... D21c 5/02
[58] Field of Search .................. 209/4, 9, 11, 162–165, 209/172, 171; 162/5

[56] References Cited

UNITED STATES PATENTS

| 1,083,234 | 12/1913 | Werst | 209/166 UX |
| 3,069,307 | 12/1962 | Boaz | 162/5 |
| 3,432,030 | 3/1969 | Olivier | 209/172 X |

FOREIGN PATENTS OR APPLICATIONS

| 265,488 | 11/1911 | Germany | 162/5 |
| 502,730 | 7/1930 | Germany | 162/5 |
| 1,079,858 | 5/1954 | France | 162/5 |

Primary Examiner—Frank W. Lutter
Assistant Examiner—Ralph J. Hill
Attorney—Donald F. Daley, James J. Ralabate and Owen D. Marjama

[57] ABSTRACT

A flotation process for the removal of toner from waste xerographic copy paper which comprises adding a thin film of an immiscible organic solvent to an aqueous bath of repulped waste xerographic paper, mildly agitating the stock suspension, and skimming off the accumulated toner contained in the immiscible organic layer.

9 Claims, 2 Drawing Figures

INVENTOR.
CHARLES J. GREEN JR.

DEINKING OF WASTE XEROGRAPHIC COPY PAPER

BACKGROUND OF THE INVENTION

This invention relates in general to a process of deinking paper and in particular to a process of removing electroscopic marking material or toner from copy paper.

Conventional methods of deinking and reclaiming waste paper which have been used in the past with some success involve the cooking of the waste stock in various deinking chemicals. Such methods were reasonably satisfactory and adequate a number of years ago when there was no need to deink and reclaim newsprint, and the balance of the waste paper did not contain ground wood. Such papers were printed with standard inks that were readily removed or saponified with chemicals at elevated temperatures.

In recent years, however, methods of deinking involving cooking and the use of chemicals have become increasingly unsatisfactory for a number of reasons. Ink formulations have become more and more complex and involve increasingly use of a wide variety of synthetic resins and plasticizers with each ink company having its own special formulations. Also increasing amounts of synthetic resins and plasticizers are being used in a wide variety of sizings and coatings. Furthermore, multicolored printing and multicolored advertisements have become increasingly important in recent years and these involve a wide variety of new ink formulations many of which incorporate new pigments, dyes and toners which are adversely affected by various deinking chemicals. These former methods of deinking and reclaiming waste paper by the use of chemicals and cooking procedures are therefore not adapted or adequate for removing these new types of inks and coating formulations. Due to their high content of thermoplastic resins, the softening action of the heat chemicals alone make the separation from the fibers very difficult. Furthermore, the action of the heat and chemicals tends to irreversibly set and more firmly bond to the fibers some of the present-day pigments and to fix dyes and toners to the fibers through staining.

For these and other reasons it will be seen that the deinking in reclaiming processes for waste paper which were in use in the past are no longer satisfactory or adequate for many current needs.

While the deinking and reclaiming processes of the prior art have become less and less effective because of the technological advance of the paper-making art the need for a satisfactory deinking and reclaiming process has become increasingly important due to the greatly expanded utilization of paper and the consequent depletion of timber reserves throughout the world.

With the progressive depletion of natural resources becoming an ever increasing problem, the need for developing useful and efficient paper-reclaiming processes becomes of critical importance.

A particular area in which conventional deinking techniques are unsatisfactory in reclaiming waste paper is in the area of electrophotography which is better known as xerography. In the art of xerography an electrostatic latent image is formed by uniformly charging a photoconductive insulating surface of a xerographic plate followed by exposing the charged surface to a pattern of light. The latent image formed by this technique is then developed with electroscopic powder, also known as toner, to form a powdered image which is then transferred to a sheet of normal bond paper. This powder image now contained on the paper is then fused into the paper to form a permanent reproduction of an original image. Reuseable photoconductive insulators such as vitreous selenium and alloys of selenium can be used over and over again to produce thousands of copies. In another variation of the xerographic process, a photoconductive paper is used. This paper is coated with a layer of photoconductive insulating material which is usually dispersed in a film-forming resin. The coated paper is imaged in the same manner described above for reusable xerography. In using the paper, however, the developed powder image is fixed directly to the paper containing the photoconductive insulating layer and no transfer is necessary.

One technique now in general use for developing xerographic images is cascade development. This technique is based on the phenomena of triboelectrification whereby upon bringing two similar materials into contact each material becomes electrically charged to a polarity opposite to that of the other. Thus when the fine powdered toner is mixed with the relatively coarse beaded carrier, the toner particles become charged triboelectrically and cling to the surfaces of the carrier beads. Development of the electrostatic image is accomplished by falling or cascading the two component developer over the surface of the xerographic plate. As the beads, covered with toner, roll over the image, the electrostatic forces of the image overcome the carrier-toner bond, and toner particles are deposited on the image areas. An example of a toner composition for this type of application consists of 25 percent polyvinyl-butyral, 70 percent of a rosin-modified phenol-formaldehyde and 5 percent carbon black which is disclosed in U.S. Pat. No. 2,753,308 to Landrigan. Various other formulations such as those disclosed in U.S. Pat. Nos. 2,638,416, to Walkup et al., and 2,735,785 to Grieg et al., can be used.

Another means of xerographic development is liquid electrophoretic development which has particular utility when photoconductive paper is xerographically processed. Developers may be prepared by dispersing finely ground pigments such as zinc oxide, phthalocyanine blue or nigrosene in an insulating hydrocarbon liquid such as toluene, carbon tetrachloride, or petroleum fractions. The pigment particles acquire electrical charges during dispersion and remain suspended in a liquid. When a photoconductive paper containing electrostatic image of the polarity opposite to that of the dispersed particles is immersed in the liquid, the pigment particles migrate and become fixed on the latent image.

Since ever increasing amounts of xerographic copy paper are being used each year effective processes for reclaiming the waste xerographic paper are very much needed. However, the effectiveness of any deinking process must take into account the fact that in the xerographic process development compositions consist of complicated organic compositions and the resulting image is fixed on the printed copy. With regard to toner development, as heretofore indicated the toner is usually made of fuseable resins or resin blends in which a pigment such as carbon black has been dispersed. The resins are selected to provide the proper triboelectric relationship with the carrier beads and to provide a melting point within the proper range for heat fixing, or sufficient solubility for solvent vapor fixing. With regard to liquid development, the pigments migrate by the phenomena of "electrophoresis" to the paper and are fixed to its surface. In essence, the action of heat, chemicals, or electrophoresis in the xerographic processes purposely print fixed development composition to the cellulosic fibers of the paper thereby almost irreversibly staining said paper.

SUMMARY OF THE INVENTION

In accordance with the present invention a novel process for deinking waste xerographic paper has been discovered and successfully reduced to practice. The instant process relates to a practical flotation technique for removal of toner from waste xerographic paper. The equipment necessary for carrying out the present process may be conventional laboratory apparatus or commercial machinery presently available in paper mills. Therefore, very little additional capitalization would be required for new equipment in using the process of the instant invention. Furthermore, the present invention makes use of common organic solvents as chemical additives which give it obvious economic advantages in considering its use.

It is therefore an object of this invention to provide a process for deinking waste xerographic copy paper that is both economical and relatively easy to perform.

It is another object of this invention to provide a process for deinking waste xerographic copy paper that produces a reclaimed pulp which may be adapted to the manufacture of conventional types of paper.

These and other objects are obtained in accordance with the present invention, wherein there is provided a method for deinking, i.e. removal of toner composition from waste xerographic copy paper. The instant process involves the application of the flotation process to waste xerographic paper; that is, the present deinking process relates to the relative capacity of toner particles to float in an aqueous solution. In particular, the present deinking process comprises adding a thin film of an immiscible organic solvent to an aqueous batch of repulped waste xerographic paper, and after mild agitation for a period of about 15 to 30 minutes, removing the accumulated toner and said immiscible organic layer. While many variations of this deinking process may be used, as will be hereinafter disclosed, the essential elements necessary to carry said process out are the following:

a. the use of an immiscible organic solvent film layer in the agitation step, or if there is more than one agitation, then in the final agitation step;

b. the adjustment of the agitation such that no vortexing or excessive mixing takes place, thereby insuring against the redistribution of the floated toner;

c. the skimming of the toner must take place as quickly as possible in order to avoid its saturation and subsequent redistribution in the pulp suspension.

BRIEF DESCRIPTION OF DRAWINGS

In order that the invention may be clearly understood, reference will now be made to the accompanying drawings in which two embodiments of the invention are illustrated.

Figure 1:
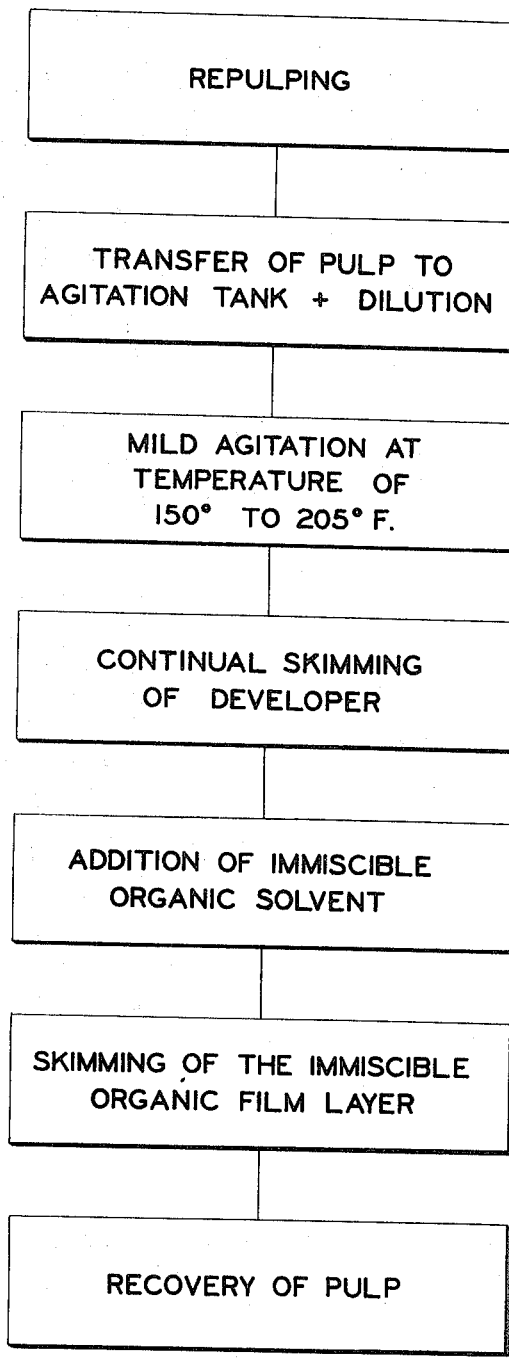
FIG. 1 is a flow diagram illustrating one embodiment of the instant invention.

In carrying out one specific embodiment of the present deinking and reclaiming process reference is made to FIG. 1 where the xerographic waste paper is first pulped by any conventional technique in a suitable fiberizing apparatus such as a hollander beater, jordan or a pulper such as the one sold by the Black-Clawson Co. under the trademark Hydrapulper. The pulping, or repulping, consists in reducing the dry waste xerographic copy paper to fibrous form, with enough water added to aid processing and freeing the material of excess fiber bundles or other uncommunicated material.

The repulped stock is then transferred to an agitation tank and diluted with an amount of water sufficient to suspend the fibers. While the degree of dilution is not critical as long as the fibers are suspended in the aqueous slurry, a concentration of from about 0.5 to 2 percent by weight pulp is preferred. At this concentration the individual fibers are not only suspended in the slurry, but can move freely without any danger of agglomeration. The repulped stock is then mildly agitated at a temperature of from about 150° F. to 205° F. The agitation must be mild to the extent that any surfacing toner is not physically redistributed throughout the slurry. By way of illustration, when a stirrer agitator is used the mixing must take place without vortexing.

The toner composition which has surfaced during the mild agitation is continually skimmed off while the bath is being agitated. While the skimming should continue as long as toner appears at the surface, it should generally be continued over limited periods of between 15 to 45 minutes in order to insure against saturation and redistribution of the toner particles.

A sufficient amount of immiscible organic solvent is then added to form a thin film layer over the stock suspension and mild agitation is resumed. While the agitation should continue for a period to effectively release the remaining toner from the fibers, generally the agitation should be carried out for a period of between 15 and 20 minutes in order to avoid saturation and redistribution. Upon completion of the mild agitation, the immiscible organic layer with the accumulated residual toner is skimmed off and the cleaned pulp reclaimed in any conventional manner.

It should be noted that while the above process has been described in terms of distinct steps, for purposes of illustration variations in said steps without detracting from the spirit of the present invention are apparent to one skilled in the art. By way of example, the whole process could be carried out in the repulper or the method performed with only one agitation.

As described above the present invention, although simple in application, can easily be scaled up to mill size operations. A large scale commercial process can be carried out by means of the following steps which are illustrated in the flow diagram of FIG. 2:

a. repulping the waste xerographic copy paper in a commercial device, b. transferring the stock suspension to a first agitation tank, c. mildly agitating the soft stock suspension, d. skimming the toner which surfaces in the agitation tank, e. transferring the stock suspension to its second agitation tank and placing a thin film or organic liquid on the stock suspension, f. mildly agitating the stock suspension in a second agitator, and g. skimming off the accumulated toner contained in the organic layer and reclaiming the cleaned paper pulp.

Figure 2:
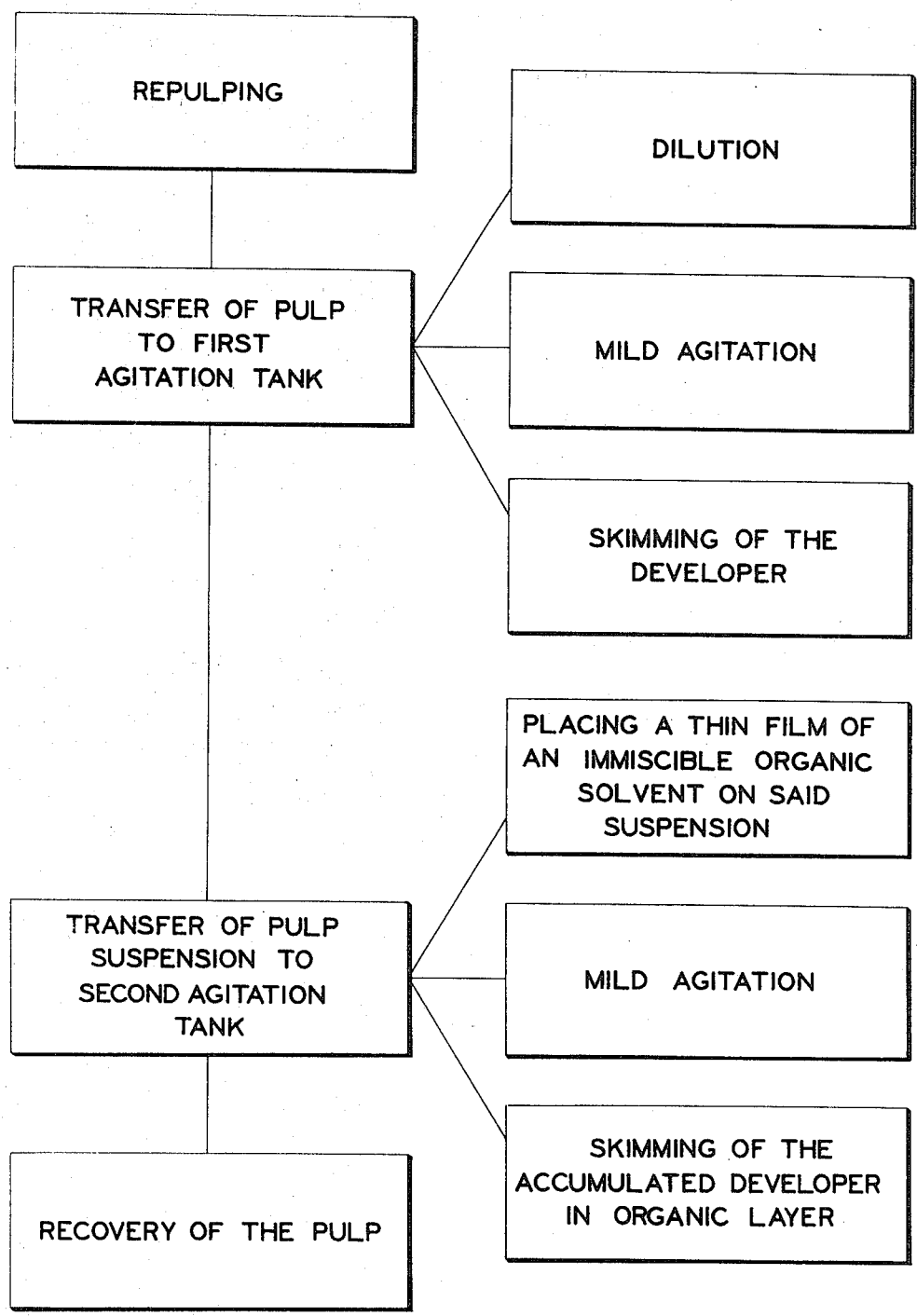
FIG. 2 is a flow diagram which illustrates one embodiment of a commercial application of the present invention.

The flow diagram shown in FIG. 2 is exemplary of a typical large-scale process incorporating the concepts of the present invention. Referring to FIG. 2, the waste paper is first introduced into a pulper or fiberizer. This apparatus may be either a batch-type beater or a continuous-type beater, a so-called Hydrapulper, or any other suitable commercial device for converting the waste paper into a pulp which can be pumped through a large-scale system. The pulping can be performed at temperatures ranging from room temperatures up to 212° F. Preferably, the pulper is one that operates continuously and therefore in as short an interval of time as possible.

After the repulping treatment, the pulp is then pumped or transferred to a first agitation tank and there diluted and mildly agitated. As heretofore mentioned, optimum dilution would be to between about 0.5 and 2 percent pulp and the temperature at which the agitation should take place should be from about 150° F to 205° F. Also the agitation must be carried out mildly to avoid physical redistribution of the floated particles.

Upon initiation of the mild agitation, toner will begin surfacing. At this point skimming of the toner should begin and should continue for a period of from about 15 to 45 minutes, depending on the amount of toner in the slurry. Generally in a large-scale process where a large amount of pulp is agitated, a large portion of developer will rise to the surface. The skimming operation should be carried out quickly, that is within 15 to 45 minutes, so as to avoid saturation redistribution.

At the point in the agitation step where no additional toner appears to surface, the paper stock is then pumped or transferred to a second agitation tank. A thin film of an immiscible organic liquid is then formed on the surface of the slurry. The slurry is then mildly agitated, without vortexing, to avoid redistribution, and the remaining toner accumulated in the immiscible organic liquid overlayer. The mild agitation is continued for a period of 15 to 30 minutes. After the agitation has been completed the immiscible organic overlayer with the accumulated toner is removed and the pulp reclaimed or thickened by any conventional process.

It should be understood that any number of variations and modifications of the described process would occur to one who is skilled in the art. However, it is essential for the process described above that both agitations be mild, that is, in the case of a stirrer-type agitator that they take place without vortexing, such that there will be no redistribution of the surfaced toner. It is further essential that the flotation, or skimming, after each agitation takes place as quickly as possible to avoid the wetting of the toner which will result in a redistribution in the pulp suspension. In addition, while the first agitation and skimming take place without the immiscible organic layer this in no way detracts from its importance in the process. The use of the immiscible organic solvent in the first agitation is optional in that a large quantity of waste xerographic paper is repulped in a large-scale process and therefore during a first agitation a large quantity of loose toner will float to the surface without the aid of the organic solvent.

For the purposes of the instant invention any organic liquid which forms a distinct physical layer when added to an aqueous solution can be used. However, optimum results are obtained when the organic solvent has a solubility of less than 10 grams per 100 cubic centimeters of water at 20° C. Any suitable organic solvent may be used. Typical solvents include benzene, toluene, cyclohexanone, xylene, tetrachloroethylene, and methyl isobutyl ketone.

In carrying the present invention, it is necessary to have a complete aqueous suspension of the repulped xerographic waste paper so that the removal of all the toner particles is possible. This may be accomplished by various mechanical or chemical means known to one skilled in the art of paper technology. By way of example, dispersing aids such as sodium hexametaphosphate, manufactured by the Calgon Corporation and sold under the trademark Calgon, alkyl phenoxypolyethoxy ethanol, manufactured by the Rohm and Haas Company and sold under the trademark Triton X100 or tetrasodium pyrophosphate can be used in dispersing the pulp.

Although the theory or mechanism for the success of the deinking process of this invention is not completely understood, it is believed that the immiscible organic solvent functions to soften the toner composition by way of partial dissolution and to provide a surface to which the toner adheres and agglomerates. Hence, when a fixed toner composition, which has been loosened from the fibers of the paper, comes into contact with the organic solvent, the toner particles become agglomerated thereby forming larger particles which are subsequently skimmed off.

According to the present deinking process, various grades of paper such as newsprint, bond, and book paper can be made from the waste xerographic paper which has been reclaimed in accordance with the present invention.

DESCRIPTION OF THE PREFERRED EMBODIMENTS

The following examples further specifically define the present invention with respect to a method of deinking waste xerographic copy paper. The percentages in the disclosure, examples, and claims are by weight unless otherwise indicated. The examples below are intended to illustrate various preferred embodiments of the process of deinking waste xerographic copy paper.

EXAMPLE I

A 5-pound batch of waste paper is introduced into a batch-type beater supplied with cold water at a temperature of 70° F. In addition about 1 percent by weight, based on the fiber content, of Calgon is added in order to aid dispersion. The batch is then subjected to pulping for a period of 20 minutes. At the end of the beating operation the stock is pumped to an agitation tank. The stock is then diluted to a pulp concentration of 1 percent. The resulting slurry is then mechanically stirred to effect a mild agitation, that is, without vortexing. Almost immediately the solid particles of toner appear at the surface of the slurry and are skimmed off every few minutes. The skimming takes place for a period of 30 minutes at which time a sample of the pulp is taken and handsheet No. 1 is made. At this point enough cyclohexanone is added to the slurry to produce a thin-film organic layer over the surface of the batch. Mild agitation was resumed for a period of 30 minutes at which time the cyclohexanone layer with accumulated developer is removed. A sample of the pulp is taken and handsheet No. 2 is made.

Of the two samples handsheet No. 2 is superior in quality in that there are no specks of toner present. Handsheet No. 1 is of poor quality having a great many toner specks throughout its surface. It can be seen from the results of example I that the organic liquid overlayer is very effective in removing the residual toner which remained on handsheet no. 1.

The following experiment is performed to indicate the importance of mild agitation to the present process.

EXAMPLE II

A 5-pound batch of waste xerographic paper is subjected to a pulping and agitation process according to the method of example I. After the addition of the cyclohexanone film layer and several minutes of mild agitation, the stirring rate is increased to a rate which results in vortexing of the slurry. As a result, the accumulated toner was redistributed throughout the slurry. The agitation was then slowed down and flotation of the toner particles in the cyclohexanone layer was resumed. Thereafter a sample of the pulp was taken and a handsheet prepared. The handsheet exhibited dispersed toner particles throughout its surface and was greatly inferior to handsheet No. 2 of example I, which clearly indicates the detrimental effects of vortexing.

While the invention has been described in terms of a preferred embodiment, it is to be understood by those skilled in the art that various changes may be made and equivalents may be substituted for elements thereof without departing from the true spirit and scope of the invention. In addition, many modifications may be made to adapt a particular situation or material to the teaching of the invention without departing from its essential teachings.

What is claimed is:

1. The method of deinking waste xerographic copy paper to reclaim the fiber content as clean pulp suitable for reuse, comprising the steps of:
   a. repulping the waste xerographic copy paper,
   b. transferring the repulped stock to a first agitation tank and diluting the entire mass,
   c. mildly agitating said stock solution, without vortexing, at a temperature less than boiling,
   d. skimming the toner which has risen to the surface of the first agitation tank,
   e. transferring the stock solution to a second agitator tank and placing a thin film of an immiscible organic liquid on the surface of said solution for the purposes of accumulating residual toner,
   f. again mildly agitating said stock solution, without vortexing, and
   g. skimming off the accumulated toner in the organic layer and reclaiming the cleaned pulp.

2. The method of claim 1 wherein the repulping takes place in a pulper.

3. The method of claim 1 wherein the mild agitation takes place for a time period of from about 15 to 45 minutes.

4. The method of claim 1 wherein the organic liquid is cyclohexanone.

5. The method of deinking waste xerographic copy paper to reclaim the fiber content as clean pulp suitable for reuse in papermaking, comprising the steps of:
   a. repulping the waste xerographic copy paper,
   b. transferring the repulped stock to a first agitation tank and diluting to about 1 percent pulp,
   c. mildly agitating said stock solution, without vortexing, at a temperature less than about 212° F.,
   d. skimming the toner which has risen to the surface of said first agitation tank,
   e. transferring the stock solution to a second agitator tank and forming a thin film of an immiscible organic liquid on the surface of said solution for the purposes of accumulating residual toner,
   f. again mildly agitating said stock solution without vortexing, at a temperature below about 212° F., and
   g. skimming off the accumulated toner in the organic layer and reclaiming the cleaned pulp.

6. The method of claim 5 wherein the organic layer is cyclohexanone.

7. The method of deinking waste xerographic copy paper so as to reclaim the fiber content as clean pulp suitable for reuse in paper making comprising the steps of:
 a. repulping the waste xerographic copy paper in a pulper at a temperature up to about 212° F.,
 b. transferring the stock to a first agitation tank and diluting the entire mass to about 1 percent pulp,
 c. mildly agitating said stock solution, without vortexing, at a temperature of about 200° F.,
 d. skimming off the toner which has risen to the surface of said first agitation tank for a period of about 30 minutes,
 e. transferring the stock suspension to a second agitator tank and placing a thin film of an immiscible organic liquid on the surface of said solution for the purposes of accumulating residual toner,
 f. again mildly agitating said stock suspension, without vortexing, for a period of about 15 to 30 minutes and at a temperature of about 200° F., and
 g. skimming off the accumulated toner in the organic layer and reclaiming the cleaned pulp.

8. The method of deinking waste xerographic copy paper so as to reclaim the fiber content as clean pulp suitable for reuse in paper making comprising the steps of:
 a. repulping the waste xerographic copy paper in a pulper at about room temperature up to about 212° F.,
 b. transferring the stock to a first agitation tank and diluting the entire mass to about 1 percent pulp,
 c. mildly agitating said stock solution, without vortexing, at a temperature of about 200° F.,
 d. skimming off the toner which has risen to the surface of said first agitation tank for a period of about 30 minutes,
 e. transferring the stock suspension to a second agitator tank and placing a thin film of an immiscible organic liquid on the surface of said solution for the purposes of accumulating residual toner,
 f. again mildly agitating said stock suspension, without vortexing, for a period of about 15 to 30 minutes and at a temperature of about 200° F., and
 g. skimming off the accumulated toner in the organic layer and reclaiming the cleaned pulp.

9. The method of claim 8 wherein the organic liquid is cyclohexanone.

* * * * *